(12) United States Patent
Hiller et al.

(10) Patent No.: US 6,499,846 B1
(45) Date of Patent: *Dec. 31, 2002

(54) PROJECTION SYSTEM WITH PROJECTOR AND DEFLECTION MIRROR

(75) Inventors: Klaus Hiller, Gera; Werner Kuhlmann, Bermatingen; Roland Buerdorff, Immenstaad, all of (DE)

(73) Assignee: LTD GmbH & Co. Laser-Display-Technologie KG, Gera (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 37 days.

(21) Appl. No.: 09/582,814

(22) PCT Filed: Nov. 4, 1999

(86) PCT No.: PCT/EP99/08445

§ 371 (c)(1),
(2), (4) Date: Jun. 30, 2000

(87) PCT Pub. No.: WO00/28378

PCT Pub. Date: May 18, 2000

(30) Foreign Application Priority Data

Nov. 5, 1998 (DE) .......................... 198 51 000

(51) Int. Cl.[7] .............................................. G03B 21/28
(52) U.S. Cl. .......................................... 353/50; 353/98
(58) Field of Search ............................... 353/46, 47, 48, 353/50, 51, 62, 98, 99, 122; 434/285

(56) References Cited

U.S. PATENT DOCUMENTS

| | | | |
|---|---|---|---|
| 2,510,080 A | | 6/1950 | Cuneo |
| 2,827,828 A | | 3/1958 | Vaux et al. |
| 4,167,311 A | * | 9/1979 | Pund ........................... 353/99 |
| 4,390,253 A | * | 6/1983 | Lobb ........................... 353/12 |
| 5,136,426 A | | 8/1992 | Linden et al. |
| 5,194,009 A | | 3/1993 | Bertsche |
| 5,365,288 A | | 11/1994 | Dewald et al. |
| 5,580,140 A | * | 12/1996 | Katz et al. ..................... 353/13 |
| 5,762,413 A | * | 6/1998 | Colucci et al. ............. 353/122 |
| 6,079,835 A | * | 6/2000 | Yu .............................. 353/119 |

FOREIGN PATENT DOCUMENTS

| | | |
|---|---|---|
| DE | 1 948 829 | 4/1970 |
| DE | 28 41 117 | 3/1979 |
| DE | 196 28 455 | 1/1998 |
| DE | 196 41 656 | 4/1998 |
| DE | 197 21 681 | 10/1998 |
| DE | 41 25 241 C2 | 8/1999 |
| FR | 1 143 806 | 10/1957 |
| GB | 2 254 936 | 10/1992 |
| WO | WO 98/13720 | 4/1998 |
| WO | WO 98/18037 | 4/1998 |

OTHER PUBLICATIONS

*English abstract of WO 98/18037.
*English abstract of DE 41 25 241 C2.
*English abstract of DE 28 41 117.
*English abstract of FR 1 143 806.

* cited by examiner

Primary Examiner—William Dowling
(74) Attorney, Agent, or Firm—Reed Smith LLP (57) ABSTRACT

In a projection arrangement with a projector and a deflecting mirror in which the image projection, proceeding from a projection direction along a principal projection axis impinges on the deflecting mirror which is supported so as to be movable in two spatial direction and whose mirror surface deflects a projected light bundle at an elevation angle and at an azimuth angle onto a projection surface standing on the ground the image projection is effected from the direction of a zenith at an angle β which is less than 60° in relation to a vertical line from the zenith and the deflecting mirror is arranged at the ground wherein the projected light bundle can be deflected toward the projection surface so that an image can be generated on the projection surface and moved on the latter.

22 Claims, 7 Drawing Sheets

PROJECTION SYSTEM WITH PROJECTOR AND DEFLECTION MIRROR

BACKGROUND OF THE INVENTION a) Field of the Invention

This application was published under PCT Article 21(2) in the German language with an English abstract: this is a request for a CPA application under 37 C.F.R. 1.53(d) (continued prosecution application) of pending prior application 09/582,814 filed Nov. 4, 1999 as PCT/EP99/08445 claiming foreign priority to DE 198 51 000.4 filed Nov. 5, 1998 to which priority is hereby claimed. The invention is directed to an arrangement with a projector and a deflecting mirror in which the image projection proceeding from a projection direction impinges on the deflecting mirror which is mounted so as to be movable in two spatial directions and whose mirror surface deflects the projection beams at an elevation angle and an azimuth angle. A projection arrangement of this type can also be called a drawing projector, since a static or moving image is generated, projected onto a projection surface, and moved on the latter.

b) Description of the Related Art

For front projection, the projection surface is a wall (e.g., projection screen) or, in the case of rear projection, a screen (e.g., ground glass screen). The projector is not limited to a certain type of image generation. Projectors which write the image by means of a brightness-modulated and/or color-modulated light beam can be used. These projectors are also known as laser projectors. However, image-forming projectors which generate an image proceeding from an object plane internal to the device as is known, for example, in CRT, LCD, DMD or slide projectors can also be used.

A deflecting device for an image generated by a laser beam is known from U.S. Pat. No. 5,365,288 DEWALD. The image is rotatable by itself by means of a K-mirror arrangement and is then deflected in such a way by a mirror mounted on two axes that the generated image can be deflected in a defined spatial area. The arrangement of the elements for the image deflection is carried out in such a way that the image is generated in a device standing on the floor and is directed to the deflecting mirror proceeding from this floor position.

In relation to a horizontal plane through the axis of rotation of the deflecting mirror, the practical useful deflection angle area resulting from this arrangement is limited toward the floor due to the required device dimensions and can be, at most, approximately 45° without substantial image shadowing, and can be at most 30° in practice toward the zenith due to the mirror dimensions increasing toward infinity.

Therefore, the observer is only afforded limited viewing possibilities which are more sharply limited in the direction of the zenith than in the direction of the floor. However, this conflicts with the customary mode of observing images that are generally projected "skyward", another reason for this being to prevent shadowing caused by other observers or by structural parts. It is impossible to generate images in the vicinity of the zenith with this arrangement.

OBJECT AND SUMMARY OF THE INVENTION

It is the primary object of the invention to increase the area of possible image presentation on a given projection surface in an arrangement of the type mentioned above. The area in which a comparatively small image can be presented within a projection surface which is large in proportion to the image size, especially in a projection dome, is to be expanded. The position of the display area should correspond to the normal viewing habits of the observer and it should also be possible to display an image in the vicinity of the zenith and in the zenith. In this respect, a high-quality monochromatic, black-and-white, or color image can be displayed at relatively little expense and, at the same time, can be moved on the projection surface, in particular, fast enough so that the observer can substantially follow the movement of the image. Further, an arrangement of a plurality of projectors is possible, wherein mutual shadowing is also minimized in this case and the area in which it is possible to display images is maximized for all projectors.

According to the invention, a projection arrangement with a projector and a deflecting mirror are suggested, wherein the image projection, proceeding from a projection direction along a principal projection axis, impinges on the deflecting mirror which is supported so as to be movable in two spatial direction and whose mirror surface deflects a projected light bundle at an elevation angle and at an azimuth angle onto a projection surface standing on the ground, wherein the image projection is effected from the direction of a zenith at an angle β which is less than 60° in relation to a vertical line from the zenith, and the deflecting mirror is arranged on the ground, wherein, further, the projected light bundle can be deflected toward the projection surface and an image can therefore be generated on the projection surface and moved on the latter.

By "zenith" is meant the zenith of the dome of the sky or the zenith of an artificial dome, e.g., in a planetarium. When it is stated that the deflecting mirror is arranged on the ground, this does not mean that it must lie directly on the ground. It can be arranged far above the surface of the ground by means of a holder or can be fastened to a wall above the surface of the ground or can also be suspended from a ceiling. However, it is essential that the projection is carried out proceeding from the direction of the zenith onto the mirror surface of the deflecting mirror. The indicated quantity of angle β signifies that the direction of the light bundle impinging on the deflecting mirror comes from the direction of the zenith. By means of the arrangement according to the invention, a surface region that is substantially larger compared to the prior art is achieved, for example, in a projection dome of a planetarium, when an image is displayed, and the image display on the projection surface is not disturbed by shadowing.

Further, the shadowing caused by projectors, other installed items or observers can be minimized. In particular, the display of the image reaches the surface region around the zenith without restrictions and without shadowing.

In an advantageous development of the invention, an image is generated by the projected light bundle only in a partial region of the projection surface and is then movable within the entire area of this projection surface. The movement can be carried out comparatively quickly because the relatively massive projector is stationary and only the comparatively small mass of the deflecting mirror must be moved.

The image should not fill up the entire projection surface statically as is the case, for example, in a cinema, but, rather, should be movable within the display area on the projection surface. The image can be equal to or greater than the projection surface for some applications. In this case, portions of the image cannot be displayed during the movement of the image. For many applications, however, it is sufficient when the size of the moving image is less than 90% in relation to the size of the projection surface. This is advantageous, for example, for image tracking for displaying set designs in entertainment applications when images are to be projected on backdrop arrangements. In this case, the image contents can always be displayed in their entirety. In many applications, the image is a comparatively small image, for example, of a planet or aircraft, that is moved on the projection surface, e.g., over the dome of the sky. However, the size of the image to be displayed by the projector can also be less than 1% of the projection surface.

The image size can be continually adjusted through the realization of a zoom function, so that, for example, an approaching or receding vehicle can be simulated in a realistic manner. This zoom function can be realized by means of known zoom optics or in an image-generating computer.

The control of the deflecting mirror can advantageously be carried out relatively simply when the axis of rotation for adjusting the elevation angle extends vertical to the principal projection axis and the axis of rotation for adjusting the azimuth angle coincides with the principal projection axis. In this case, no image distortions occur as a result of the deflection of the image by the deflecting mirror. It is particularly advantageous when the direction of the principal projection axis to the deflecting mirror is a line parallel to the vertical line from the zenith. In this case, angle $\beta$ is 0°. One of the axes of rotation of the deflecting mirror then contributes only one movement component to the azimuth position and to the elevation position of the image. This enables a particularly simple correlation of the image position in the area of the projection surface.

When the direction of the principal projection axis onto the deflecting mirror lies in the vertical line from the zenith of a spherical projection dome, a movement of the image by 360° can be realized particularly favorably. A particularly advantageous arrangement is achieved when the projector is arranged in the zenith of a projection dome and the deflecting mirror is arranged on the floor of projection dome, wherein the axis of rotation for the adjustment of the azimuth angle coincides with the vertical line from the zenith. The projector is then located outside of the projection dome and the coupling in of radiation is carried out through a small opening in the zenith of the projection dome. In this case, only the deflecting mirror is still arranged inside the projection dome. Another advantageous arrangement is achieved when the deflecting mirror is arranged in the center of a spherical projection dome. The projection distance from all areas of the projection dome is identical in this case. The size of the image is then identical at all angle positions without further steps.

In particular, this arrangement facilitates image generation by means of image-forming projectors, for example, slide projectors, LCD projectors or DLP projectors, since the possible area of the depth of focus of projectors of these types is only relatively small and no additional steps are required in this case for adjusting or producing the image focus. When projection is carried out with projectors of these types from outside the spherical center or the image is directed onto an aspherical projection wall, a readjustment of the image focus as a function of the image position is compulsory. With larger images, partial areas of the image can also be out of focus.

This problem does not occur when using a projector which works with a writing, essentially parallel, laser light bundle. Images generated in this manner are focused within a very large area amounting to several meters at any projection distance. Such projectors are known as "laser projectors".

It has been shown in practice that the image size is perceived by the observer as stationary when the deflecting mirror is arranged in relation to the projection surface in such a way that the projection distance from every point of the projection surface deviates from an average projection distance by less than +/−10%. This result is achieved especially when the observer lacks a comparison scale. A zoom function of the projector for readjusting the image size is not absolutely necessary. However, for subordinate applications, a deviation of +/−20% is also acceptable.

The size of the area in which a good-quality image is movable on the projection surface without shadowing by a deflecting mirror that is not too large depends first on the overall size of the projector or its subassemblies located in the projection dome. As will be shown subsequently in the embodiment examples of the invention, this factor can be minimized absolutely. The size of the projection surface that can be utilized for image projection is further determined by the position of the axes of rotation of the deflecting mirror relative to the projection surface. The height of the deflecting mirror in relation to the horizon given, for example, in a projection dome, is a critical determinant for the size of the accessible area for displaying the image. When the axis of rotation generating the elevation angle lies above the horizon, the display area is reduced; when it lies below the horizon, the area in which it is possible to display the image is increased. In extreme cases, the projection dome is a sphere, the projector is located at the zenith and the deflecting mirror is located opposite the zenith on the ground. There are virtually no restrictions with respect to the shape of the projection surface, especially with a laser projector, because of the virtually unlimited depth of focus. The projection surface can be the inner surface or the outer surface of a sphere, a part of a sphere, or a layer of a sphere, or an aspherically curved surface corresponding to the basic shapes mentioned above. However, it can also be a plane surface or can be formed of a plurality of parts of such a surface, or can be shaped in a completely irregular manner and/or be moved dynamically.

A particularly favorable use of space and a very practical construction are achieved when a stationary path-folding or reflection mirror which deflects the light bundle proceeding from the projector is arranged relative to the projector. The choice of how and where the projector is arranged in relation to the projection surface is relatively open. It is only necessary to meet the condition that the light bundle travels from the direction of the zenith after deflection through the reflection mirror.

In an image-forming projector, the reflection mirror is arranged behind the projection objective in the direction of radiation. With a laser projector with a writing light bundle, the reflection mirror is provided behind the deflecting device for scanning lines in the image or behind the angle-transforming transformation optics that are used in most cases. The reflection mirror is advisably fixedly connected with the projector. Owing to the simplicity of control with angular coordinates, it is further advisable when the stationary reflection mirror is at an angle of 45° to the principal projection axis from the projector. In this regard, it is particularly advantageous when the projector itself is at an angle of 90° to the azimuthal axis of rotation of the deflecting mirror. However, the reflection mirror can also be movable in order to generate special image effects. For example, the light bundle which is directed to the deflecting mirror can be redirected to another deflecting mirror with a different mirror position by means of a controllable reflection mirror. In this way, sudden image movements can be generated, for example, when changing between the two deflecting mirrors which are arranged next to one another and have different mirror positions.

A laser projector comprises at least one brightness-modulated and/or color-modulated laser radiation source and a deflecting device for scanning the light bundle in two dimensions. For the use of laser projectors in projection rooms, it is particularly advantageous when the brightness-modulated and/or color-modulated laser radiation source and the projection head are optically connected with one another in a projector of this type by a light-conducting fiber. The laser radiation source is a monochrome laser radiation source or a red-green-blue laser radiation source by which light can be efficiently coupled into a light-conducting fiber. The spatial separation of the light source and projection head which is made possible by the light-conducting fiber connection provides many design possibilities with respect to how the installation of the projector can be carried out, for example, in a projection dome.

The spatial separation of the subassemblies or component groups does not cause any problems with respect to the setup of a contemporary, relatively heavy and large laser beam source adjacent to or under the projection dome or with respect to the arrangement of the comparatively small projection head in the projection dome or on the projection dome. Even arranging the projection head in the zenith of a projection dome does not cause problems in this case. As subassemblies become smaller and lighter with progressing development, it will become easier to mount the projection system in a housing.

The projection head contains a horizontal-line mirror and a vertical-line mirror for scanning the light beam. Further, transformation optics which increase the scanning angle are arranged downstream in the direction of light when required by the projection ratios (the image size to be achieved at a given projection distance). These transformation optics can also contain a controllable zoom function when the image size is to be adjusted or varied during the image display. The electronic control of the zoom factor is carried out as a function of the desired image size on the projection surface, wherein changes in the image size due to changes in the projection distance can also be compensated for.

But the invention can also be realized using image-forming projectors, for example, with a film projector, a slide projector, an LCD projector or a CRT projector. In projectors of the types mentioned above, a projection objective is generally used in order to be able to adjust the desired image size. In this case, temperature radiators are conventionally used as light sources. The projector can also be divided up into the subassemblies of light source and projection head in this case. In contrast to the laser projector, the projection head contains the object plane with a projection objective associated with the latter.

The optical connection between the subassemblies can also be produced via a light-conducting fiber or bundled light-conducting fibers. The advantage that the heat output occurring during operation of a temperature radiator need not be given off in the projection space is applied in particular in this case.

However, a laser radiation source can also be used in image-forming projectors, although it must be expanded for illuminating the object field. In this case, the light transmission from the laser light source to the object field is likewise provided via a light-conducting fiber. With a stationary installation, the possibility of light transmission between the light source and projection head in free space, irrespective of the type of projector, is also a particularly advantageous variant; in this case, when the light source is set up outside of the projection space, the light must be guided through an opening in the projection screen or in the projection dome.

The projection systems described above can be combined with a pilot laser for training purposes and measurement purposes. In this connection, the wavelength of the pilot laser beam is not the same as the wavelengths of the projection beams. The pilot laser beam can be coupled into the beam path in such a way that it represents a fixed point in the deflected image and is movable together with the image. The reflection mirror is particularly suitable for coupling in the pilot laser beam; this reflection mirror is transparent for light of the wavelength of the pilot laser beam and reflects all other wavelengths. However, the pilot laser beam can also be coupled into the beam path of the projection arrangement at another location, for example, via an additional coupling-in mirror, wherein coupling in should be carried out subsequent to the deflecting system and transformation optics because of the wavelengths of the pilot laser beam which lie outside of the range of visible light. The direction of the pilot laser beam can also correspond to the position of the principal projection axis in particular or can be correlated to a determined object in the projected image.

The movement of the image can be tracked by a direction-sensitive receiver that is adjusted to the wavelength of the pilot laser beam, or an automatic or manual image tracking can be detected and evaluated.

The above description of the projection arrangement working with a projector and a deflecting mirror also shows advantages when more than one projector is set up in a projection space. For example, a first projector can project a scene filling up the projection surface and a second projector, by means of the deflecting mirror, supplies a comparatively small image which is movable within the scene and which can be displayed completely independent from this scene.

In another variant, a plurality of projectors are directed to a projection surface with respective associated deflecting mirrors. Accordingly, for example, three images showing different objects can be moved over the projection surface independently from one another. Each of the images can show an aircraft, for example. In so doing, the deflecting mirrors can be arranged next to one another in horizontal direction, wherein the directions of the light bundles impinging on the mirror surfaces of the deflecting mirrors also proceed from the direction of the zenith in this case.

The deflecting mirrors can also be arranged one above the other in vertical direction. In addition, the deflecting mirrors can lie next to one another. However, it is advisable when projectors with reflection mirrors are used and the directions of the principal projection axes of the light bundles coincide following the beam deflection through the respective associated reflection mirrors.

All deflecting mirrors are accordingly arranged at a short distance exactly one above the other. In this way, the projection ratios are virtually identical for all projectors, since the projection of all images is effected proceeding from virtually the same location. In this case, the condition that the projection distances of the projectors from the average projection distance is less than +/−10% can easily be satisfied.

The enlarged angular range in which images can be displayed without any shadowing is particularly advantageous compared with known projection arrangements. This advantage comes into play particularly when more than one projector must be arranged in a projection space. Moreover, the position of the angular area, for example, in relation to a position of the projector in a projection dome, is more favorable because now images can be displayed in the area of the zenith until far below the horizon. When using a projector working with a writing laser light bundle, the advantages that images produced in this way have a virtually unlimited depth of focus and that a very extensive correction of image errors can be carried out are particularly useful.

In the following, the invention will be described more fully by way of example with reference to the drawings.

DESCRIPTION OF THE PREFERRED EMBODIMENTS

The invention will be described in the examples according to FIGS. 1 to 4 with reference to projection in a dome space as is used for planetaria or simulation installations. However, particularly when applying projection methods with a writing light beam, other projection screens of any desired shape can be used, since very extensive correction possibilities for image distortions are available in this case and the image is sharp in every plane as is shown in FIG. 5 by the example of a rear projection. Therefore, a projector with a writing laser light beam is especially suitable in this case, as is shown, for example, in FIG. 6. Identical reference numbers denote identical features in the Figures.

Figure 1:
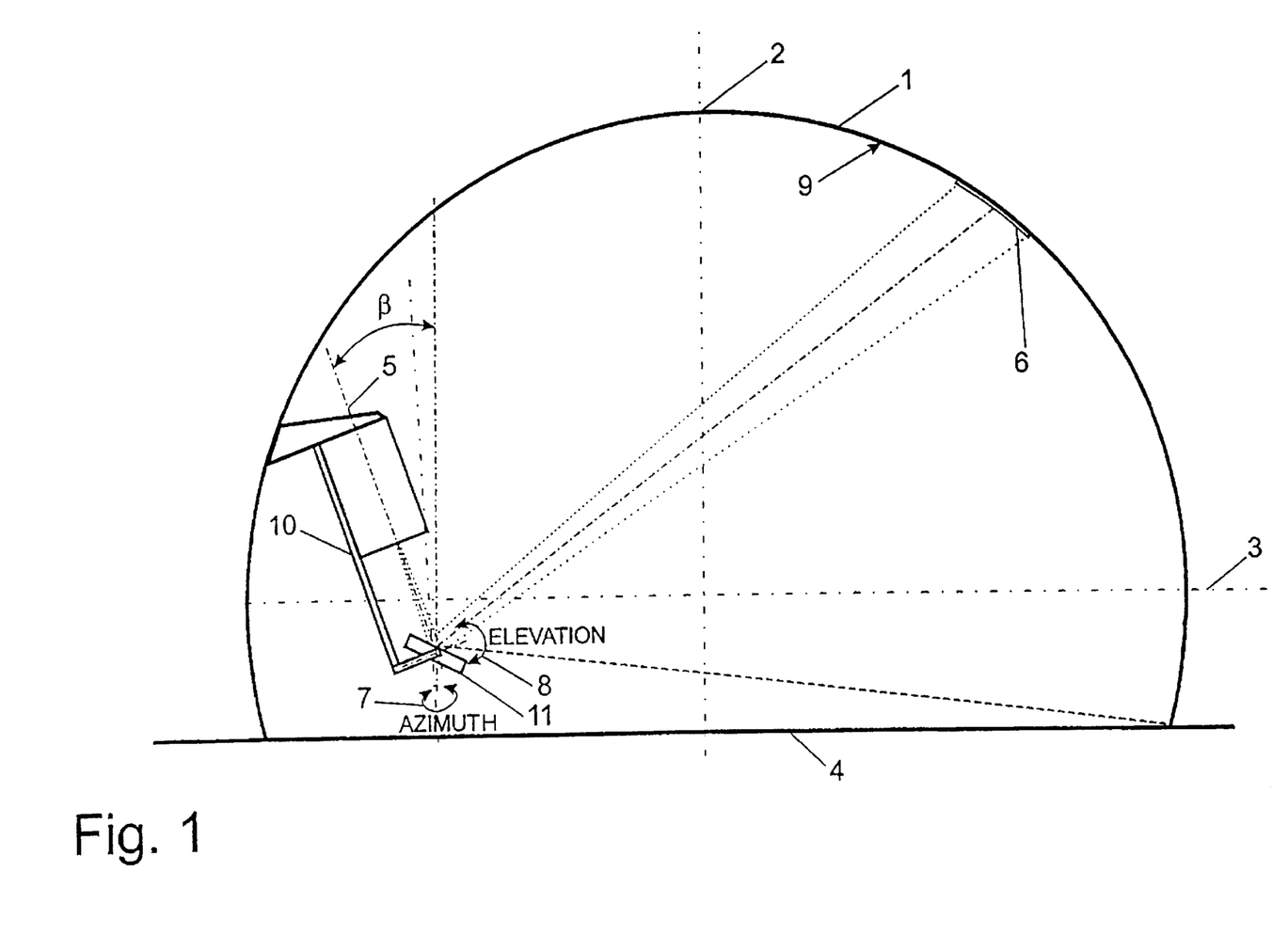
FIG. 1 shows a projection arrangement according to the invention with a projector which is mounted on the wall of a projection dome.

The projection space of a projection dome 1 is shown schematically in FIG. 1. The projection dome 1 has a zenith 2 and a horizon 3. In the example, the floor 4 of the projection dome 1 lies below the horizon 3. The principal projection axis 5 of a projector 10 lies at an angle β to the vertical line from the zenith 2. Viewed in the direction of light, the light from the projector 10 arrives at a deflecting mirror 11 which is arranged toward the floor, mounted so as to be rotatable about two axes, and moved in such a way that a projected image 6 is movable in the angular areas about an azimuthal rotational axis 7 by approximately 340° and about a rotational axis of elevation 8 by about 100° on the projection surface 9 without any shadowing caused by the projector 10. In the example shown, the projector 10 is an LCD projector.

In the shown example, angle β is approximately 25°. It can be seen that, in this instance, the projected image 6 can be moved within a very large part of the projection surface 9 without any shadowing. If the inclined position β of the principal projection axis 5 from the projector 10 exceeds the angle of approximately 60°, it is no longer possible in practice to move a projected image 6 in the dome area below the horizon 3. For one, a greater angle β requires a larger surface of the deflecting mirror 11, which has a disadvantageous effect on its movement dynamics. On the other hand, with very flat angles of incidence on the deflecting mirror 11, the projection ratios deteriorate dramatically.

The associated electromechanical driving and electronic controlling of the deflecting mirror 11 in the two angular coordinates can be carried out relatively simply when the azimuthal rotational axis 7 is parallel to the vertical line on the zenith 2 and the rotational axis of elevation 8 lies in a parallel line to the horizon 3. Control is even simpler when the principal projection axis 5 on the deflecting mirror 11 agrees with the direction of the azimuthal rotational axis 7. Normally, therefore, the angle β is selected at 0°.

Figure 2:
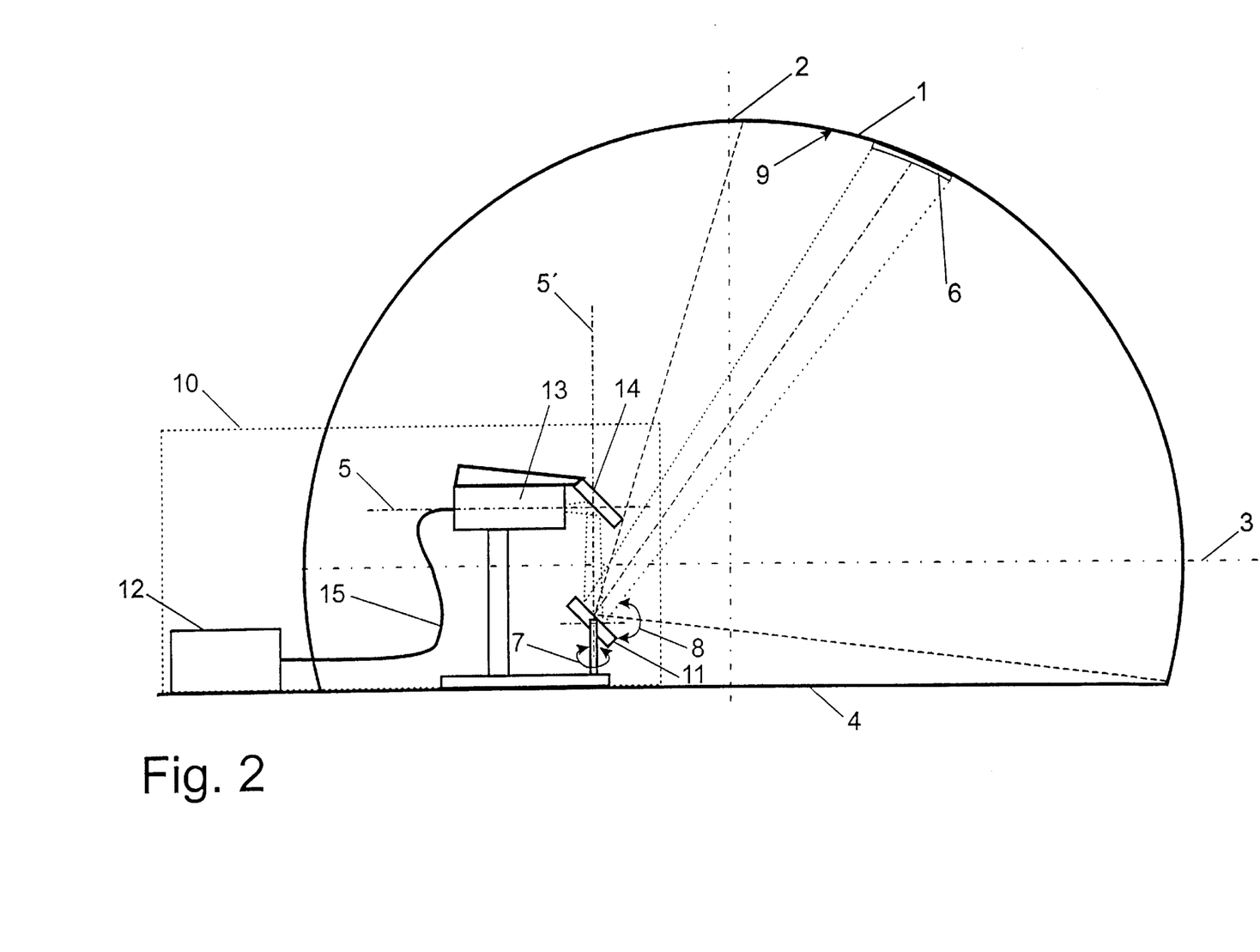
FIG. 2 shows a projection arrangement, according to the invention, with a projection head with reflection mirror mounted in a projection dome with a light source outside of the projection dome.

In the example according to FIG. 2, the projector 10 is only partially located in the projection dome 1 and generates the projected image 6 by means of a laser light beam which is deflected in two dimensions. In this case, the projector 10 comprises a red-green-blue laser light source 12 which can be modulated with respect to brightness and color and a projection head 13 with a stationary reflection mirror 14 and the deflecting mirror 11 which is movable on two axes. Electrical connections and a light-conducting fiber connection 15 for transmitting the brightness-modulated and color-modulated laser light beam are located between the laser light source 12 and the projection head 13. The projection head is set up in this case on the floor and can have substantially smaller external dimensions compared with the example in FIG. 1, so that shadowing by the projector 10 is further reduced.

Shadowing can be reduced further in that the projector 10 is arranged with its principal projection axis 5 essentially horizontal. The principal projection axis 5' is deflected in a direction at angle β to the vertical line from the zenith 2 by means of a stationary reflection mirror 14 fastened to the light outlet of the projection head 13. In the example, β=0°.

Figure 3:
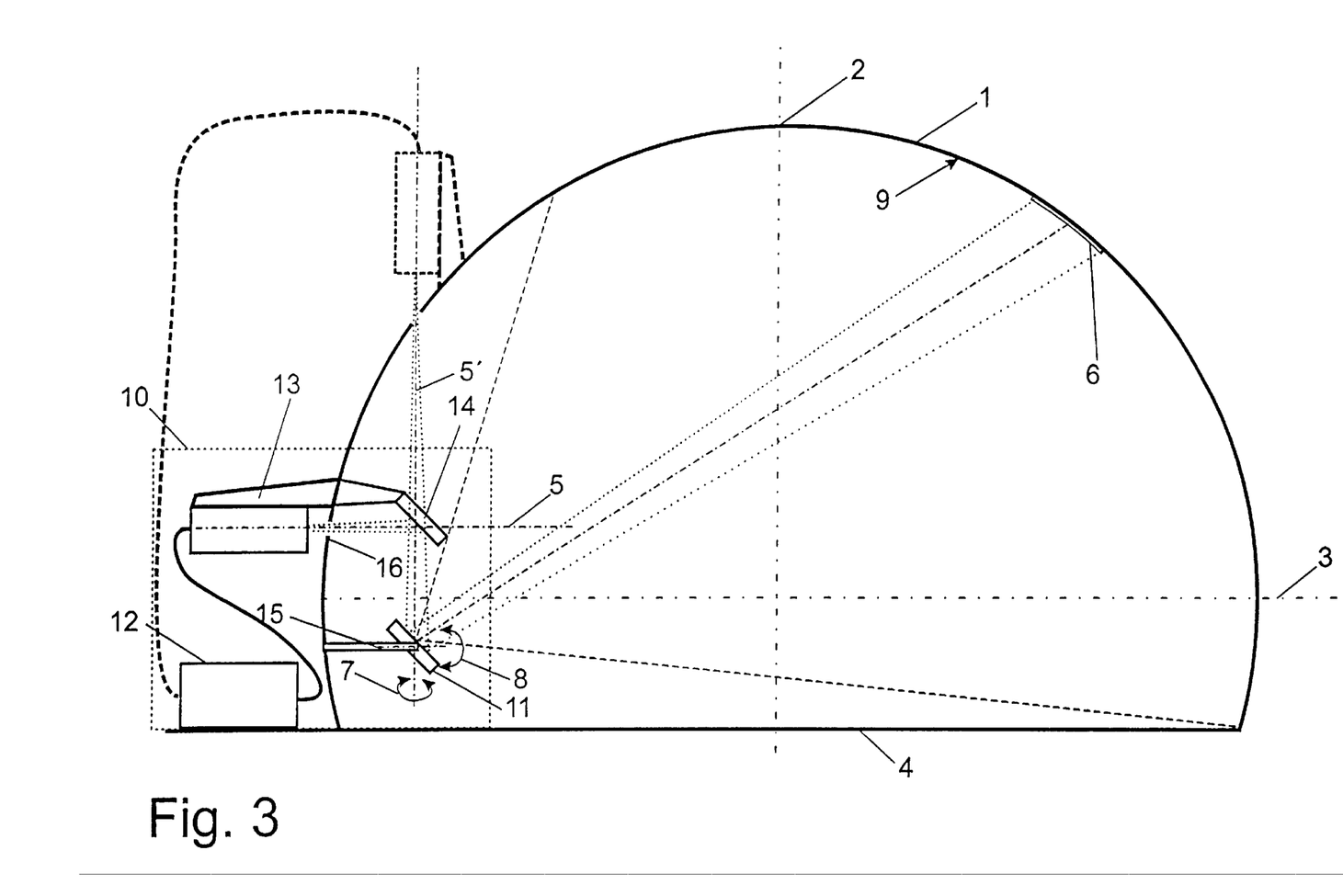
FIG. 3 shows a projection arrangement according to the invention with a projection head with a light source outside the projection dome and with a reflection mirror with deflecting mirror mounted in the projection dome.

In FIG. 3, the projector 10 with its red-green-blue laser light source 12 and the projection head 13 are set up outside of the projection dome 1. Only the stationary reflection mirror 13 and the deflecting mirror 11 which is movable about two axes 11 are located in the projection dome. The deflected brightness-modulated and color-modulated laser light bundle enters through an opening 16 in the projection dome 1 in which only the reflection mirror 14 and deflecting mirror 11 are arranged. When the arrangement of the projection head is selected in such a way that its principal projection axis 5 is parallel to or at an angle β>0° to the vertical line from the zenith 2, the stationary reflection mirror can also be omitted (indicated by dashed lines).

Figure 4:
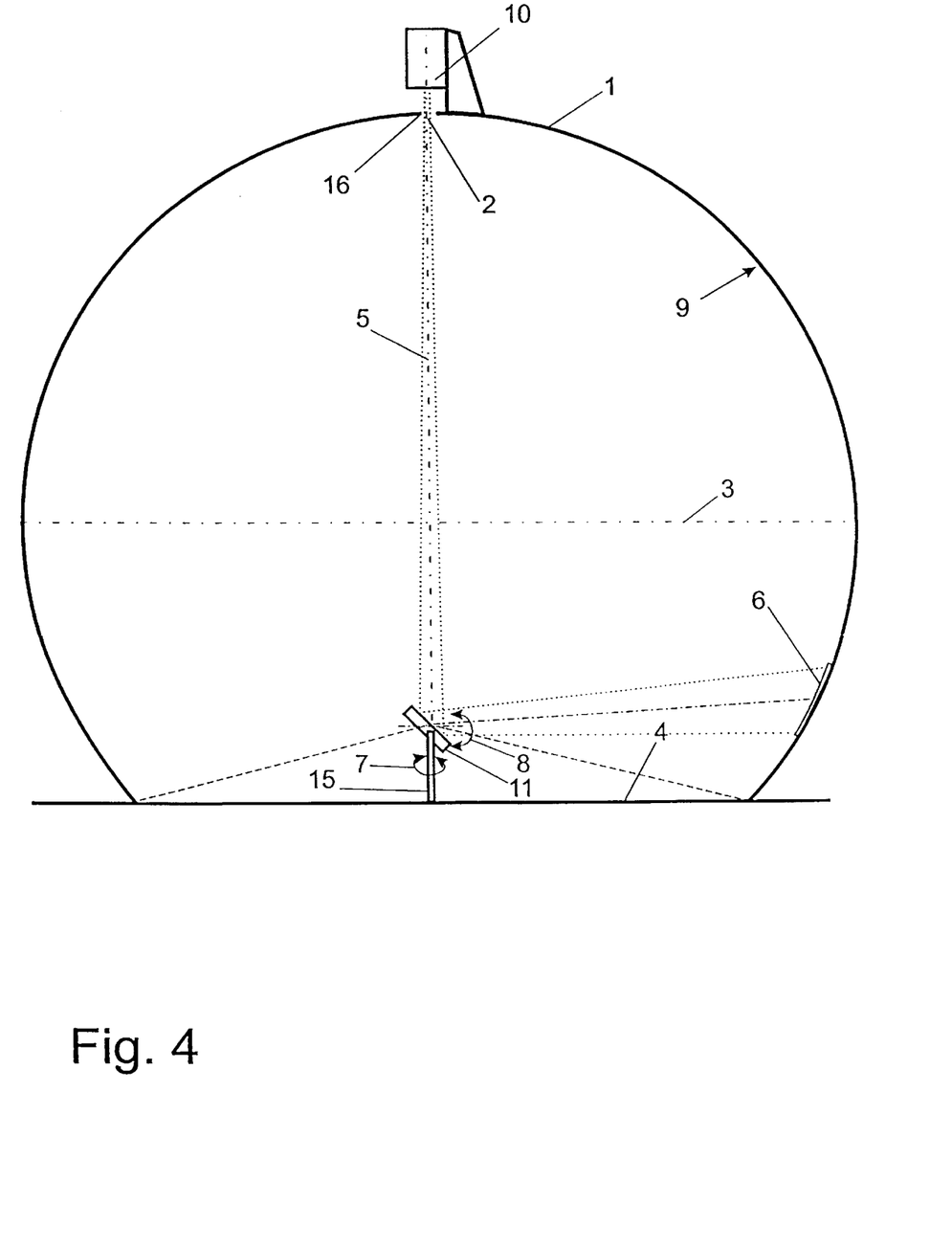
FIG. 4 shows a projection arrangement according to the invention with a projector which is mounted in the zenith of a projection dome.
Figure 5:
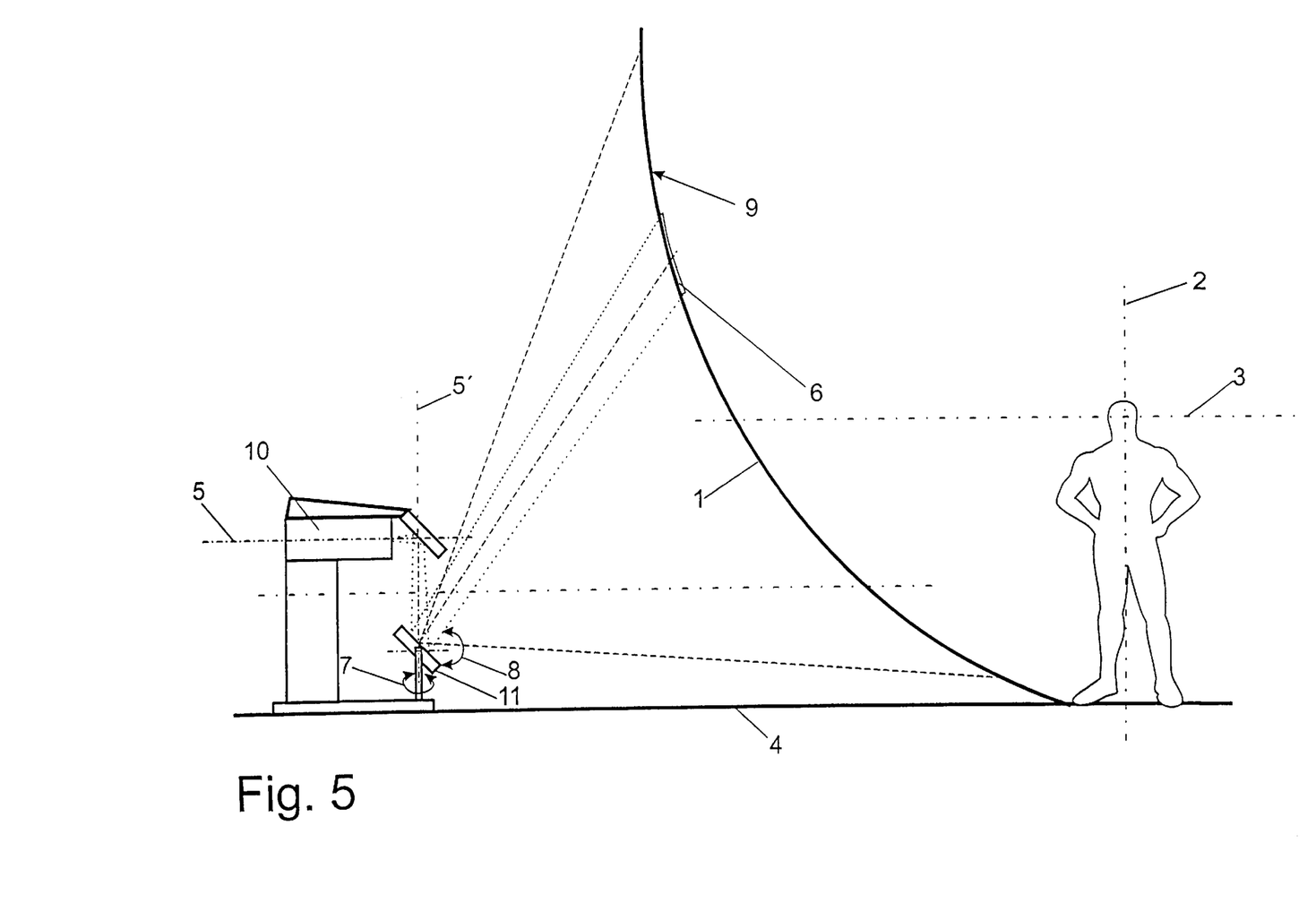
FIG. 5 shows a projection arrangement according to the invention with a rear projector with reflection mirror.

FIG. 4 shows an advantageous arrangement of the projector 10 outside the projection dome 1. In this case, projection proceeds through the opening 16 from the zenith 2 of the projection dome in the vertical line onto the deflecting mirror 11 which is arranged at the floor and which can be deflected about two axes. In this case, the image 6 can be moved within the entire space of the three-fourths sphere. However, it is possible to move the image 6 in areas well below the horizon 3. The majority of the surface of the spherical space below the horizon 3 can be reached by the moving image without needing to deflect the deflecting mirror 11 by substantially more than 60° as measured from the vertical line. Naturally, the dome projection, described in FIGS. 1 to 4, onto a projection surface 9 can also be used equally well when the projection surface 9 is transparent and the observer views the image from outside the dome. The projection surface 9 can have virtually any shape, particularly with a laser projector, because extensive possibilities for correction of image errors can be used in this case.

FIG. 5 shows an example of rear projection. The projection surface 9 is a light-permeable aspherical screen in this case. The image projection is carried out on the back of the screen and the image is viewed from the front. Considered in the direction of light, the light proceeds first from the projector 10 onto the reflection mirror 14 and then onto the deflecting mirror 11 which is arranged at the floor and is mounted so as to be rotatable about two axes. The latter is moved in such a way that a projected image 6 can be moved in angular areas about an azimuthal axis of rotation 7 by approximately 340° and about an axis of rotation of elevation 8 by about 90° and can be displayed on a suitably shaped screen.

Figure 6:
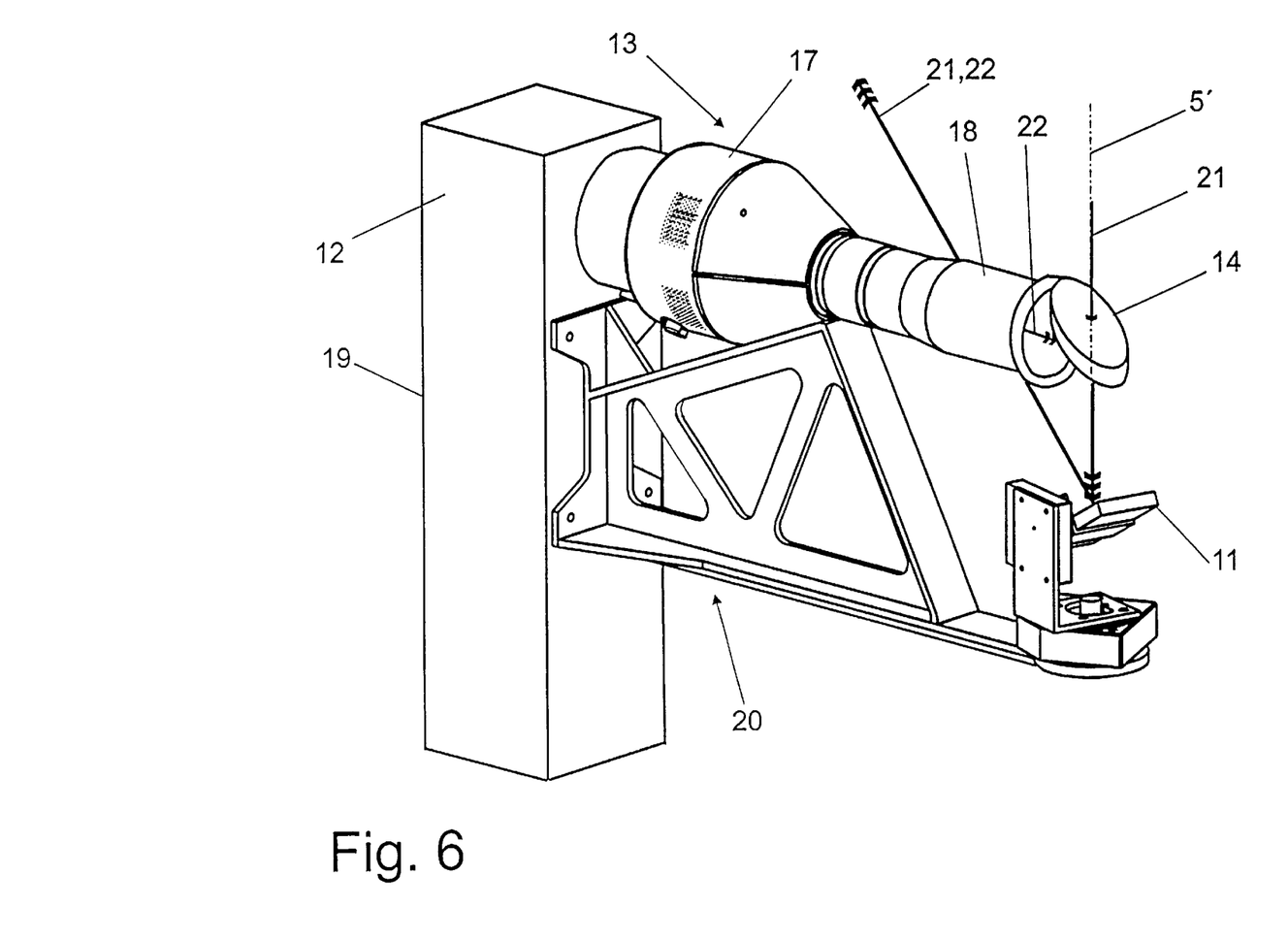
FIG. 6 shows the construction of a projector with reflection mirror.

FIG. 6 shows the construction of a projector 10 with a laser light source 12 and a projection head 13. The projector comprises the following subassemblies arranged in the direction of light: laser light source 12, deflecting device 17, transformation optics 18, reflection mirror 14 and deflecting mirror 11 which can be deflected about two axes and which has a drive mechanism. The laser radiation source 12 and the electric controls for operation of the laser light source, the modulation of the laser light, for the deflecting device 17, the zoom function of the transformation optics 18, and the drives for the deflecting mirror 11 are located in a housing 19. The subassemblies comprising the deflecting device 17, transformation optics 18, reflection mirror 14 and deflecting mirror 11 which can be deflected about two axes and has the drive mechanism are mounted on a frame 20 which is connected with the housing 19. This housing 19 stands on the floor 4 of the projection dome 1. A separation of the light source 12 and projection head 13 can be carried out as is shown in FIG. 3. In this case, the housing 19 is separate and the frame 20 is fastened, for example, to the wall of the projection dome 1. Further, FIG. 6 shows that a pilot laser beam 21 is optionally coupled in via a partially-transparent reflection mirror 14 in the direction of the principal axis of projection 5' on the deflecting mirror 11. The pilot laser beam 21 is deflected with the light bundle 22 used for image generation by the deflecting mirror 11 and can accordingly always be associated with a position in the displayed image.

Figure 7:
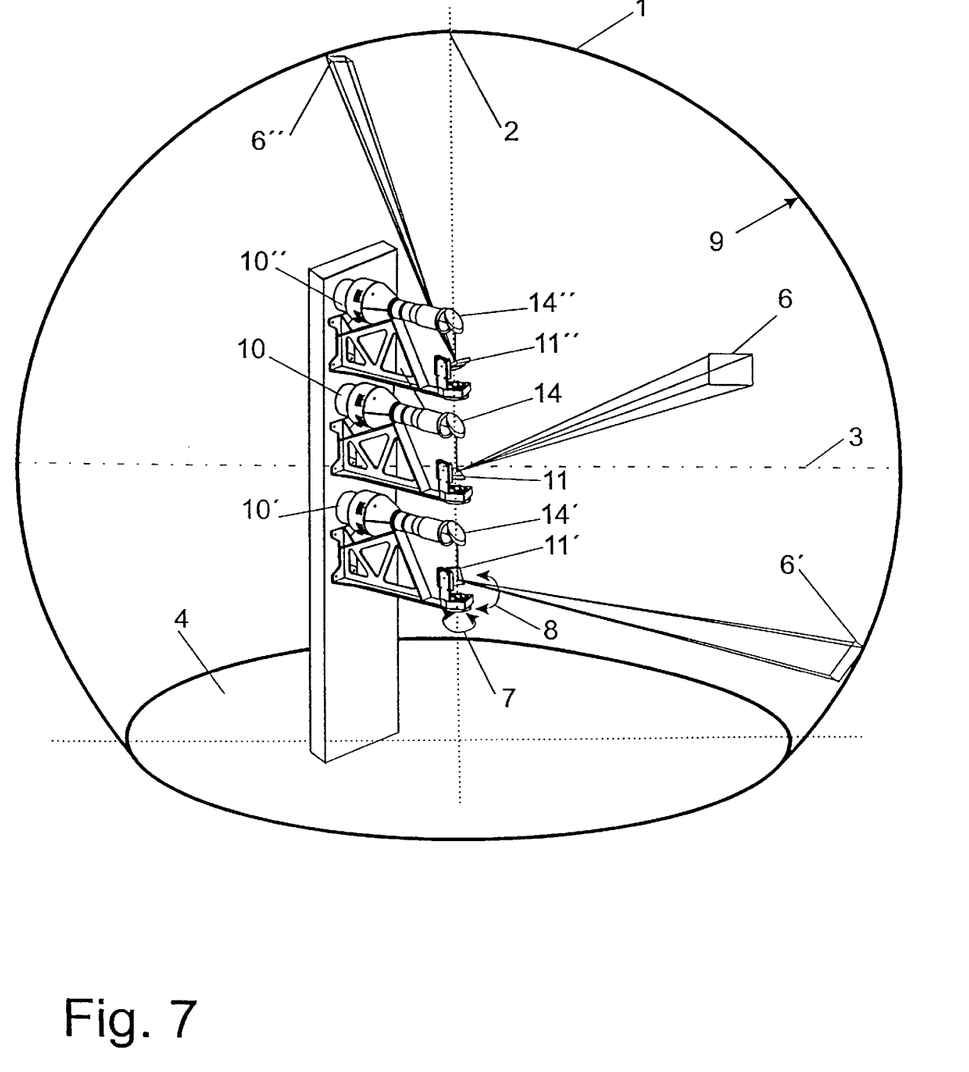
FIG. 7 shows a projection arrangement according to the invention with a plurality of projectors arranged one above the other in a projection dome.

FIG. 7 shows a projection space with a spherical projection surface. In the projection space, three projectors 10, 10', 10" with associated reflection mirrors 4, 14', 14" and deflecting mirrors 11, 11', 11" according to FIG. 6 are arranged one above the other in such a way that the directions of the principal projection axes following the beam deflection through the reflection mirrors lie on a straight line which is identical to the vertical line from the zenith 2. Each of the three projectors corresponds to the projector shown in FIG. 6 with respect to construction. The three projectors are arranged in the vicinity of the geometric center of the projection dome 1. Therefore, the projection distances from all projectors 10, 10', 10" to all parts of the projection surface 9 are roughly identical.

The depiction of the three projectors 10, 10', 10" in FIG. 7 is not in scale in relation to the depiction of the size of the projection dome 1. The projection dome 1, for example, has a diameter of 20 meters, while an individual projector 10 has a length of 900 mm, a height of 400 mm and a width of 200 mm. FIG. 7 shows that the deflecting mirror 11 of the center projector 1 is arranged exactly in the center of the projection dome 1. The deflecting mirrors 11', 11" of the other projectors 10', 10" are at a distance of approximately 500 mm from the center, respectively. With a line opening angle of 5°, the image 6 generated by the center projector 10 has a width of approximately 900 mm. The resulting difference in the image width of the images 6', 6" from the two other projectors 10', 10" compared to the image 6 of the center projector 10 is approximately 45 mm. Therefore, the maximum possible size differences of the images lies in a range that is not detectable by the observer, especially in the case of moving images.

While the foregoing description and drawings represent the present invention, it will be obvious to those skilled in the art that various changes may be made therein without departing from the true spirit and scope of the present invention.

REFERENCE NUMBERS projection dome 1
zenith 2
horizon 3
floor 4
principal projection axis 5
image 6
azimuthal axis of rotation 7
elevation axis of rotation 8
projection surface 9
projector 10
deflecting mirror 11
light source 12
projection head 13
reflection mirror 14
light-conducting fiber 15
opening 16
deflecting device 17
transformation optics 18
housing 19
frame 20
pilot laser beam 21
light bundle 22

What is claimed is:

1. A projection arrangement comprising:
   a projector and a deflecting mirror in which the image projection, proceeding from a projection direction along a principal projection axis, impinges on the deflecting mirror;
   said deflecting mirror being supported so as to be movable in two spatial directions and whose mirror surface deflects a projected light bundle at an elevation angle and at an azimuth angle onto a projection surface standing on the ground;
   the image projection being effected from the direction of a zenith at an angle β which is less than 60° in relation to a vertical line from the zenith, and the deflecting mirror being arranged at the ground; and
   wherein the projected light bundle can be deflected toward the projection surface so that an image can be generated on the projection surface and moved on said surface.

2. The projection arrangement according to claim 1, wherein an image can be generated by the projected light bundle only on a partial surface of the projection surface and this image is then movable within the area of the projection surface.

3. The projection arrangement according to claim 1, wherein an axis of rotation for adjusting the elevation angle extends vertical to the principal projection axis and an axis of rotation for adjusting the azimuth angle coincides with the principal projection axis.

4. The projection arrangement according to claim 1, wherein angle β is 0°.

5. The projection arrangement according to claim 1, wherein the principal projection axis coincides with the vertical line from the zenith of a projection dome.

6. The projection arrangement according to claim 5, wherein the projector is arranged in the zenith of a projection dome and the deflecting mirror is arranged at the floor of the projection dome, wherein the axis of rotation for the adjusting of the azimuth angle coincides with the vertical line from the zenith.

7. The projection arrangement according to claim 1, wherein the deflecting mirror is arranged in relation to the projection surface in such a way that the projection distance from every point of the projection surface deviates from an average projection distance by less than +/−10%.

8. The projection arrangement according to claim 1, wherein a reflection mirror is arranged between the projector and the deflecting mirror, which reflection mirror deflects the light bundle proceeding from the projector in such a way that the direction of the principal projection axis of the light bundle is directed from the zenith after deflection by the deflection mirror at an angle β.

9. The projection arrangement according to claim 8, wherein the reflection mirror is arranged so as to be stationary.

10. The projection arrangement according to claim 9, wherein the mirror surface of the reflection mirror is at an angle of 45° to the principal projection axis of the light bundle coming from the projector and, further, is arranged at an angle of 45° to the vertical line from the zenith.

11. The projection arrangement according to claim 1, wherein the projector is a laser projector which comprises, as light source, a laser radiation source which can be modulated by the image information and a deflecting device for deflecting the light bundle in two dimensions.

12. The projection arrangement according to claim 11, wherein the light source of the laser projector is a monochrome laser radiation source or a red-green-blue laser radiation source.

13. The projection arrangement according to claim 11, wherein the deflecting device contains a horizontal-line mirror and a vertical-line mirror for scanning the light bundle and transformation optics by means of which the angular deflections of the light bundle can be adjusted in the horizontal and vertical dimensions.

14. The projection arrangement according to claim 1, wherein the projector is an image-forming projector, wherein the light source is a laser radiation source or a temperature radiator.

15. The projection arrangement according to claim 11, wherein a light-conducting fiber is provided which is connected by one end to a light source and by its other end to the deflecting device in a projection head of the laser projector or is optically connected with an object field of the image-forming projector.

16. The projection arrangement according to claim 1, wherein a pilot laser beam whose light wavelength is not the same as the wavelength(s) of the light bundle(s) can be coupled into the beam path for projection of the image in such a way that the pilot laser beam is correlated with a fixed point in the deflected image, wherein it coincides with the position of the principal projection axis and is movable together with the image on the projection surface by the deflecting mirror.

17. The projection arrangement according to claim 16, wherein the pilot laser beam can be coupled in via a reflection mirror which transmits its wavelength.

18. The projection arrangement according to claim 1, wherein there is arranged in relation to a projection surface a first projector which projects a scene filing up the projection surface, and there is further arranged in relation to the projection surface a second projector with associated deflecting mirror, wherein the second projector projects a comparatively small image which is movable within the scene and which can be displayed completely independent from this scene.

19. The projection arrangement according to claim 1, wherein more than one projector with respect associated deflecting mirrors is directed to a projection surface.

20. The projection arrangement according to claim 19, wherein the deflecting mirrors are arranged next to one another in horizontal direction, and the directions of the light bundles impinging on the mirror surfaces of the deflecting mirrors proceed from the direction of the zenith.

21. The projection arrangement according to claim 19, wherein the deflecting mirrors are arranged one above the other in vertial direction.

22. The projection arrangement according to claim 8, wherein the deflecting mirrors are arranged one above the other in vertical direction and wherein the directions of the principal projection axes of the light bundles coincide following the deflection through the respective associated reflection mirrors.

* * * * *